United States Patent [19]
Nakamura et al.

[11] Patent Number: 5,605,633
[45] Date of Patent: Feb. 25, 1997

[54] PROCESS FOR TREATING PHOTOGRAPHIC WASTE WATER

[75] Inventors: Takashi Nakamura; Koji Matsuo; Masaharu Yamada, all of Kanagawa, Japan

[73] Assignee: Fuji Photo Film Co., Ltd., Kanagawa, Japan

[21] Appl. No.: 348,806

[22] Filed: Nov. 29, 1994

[30] Foreign Application Priority Data

Nov. 29, 1993 [JP] Japan .................................. 5-320928

[51] Int. Cl.$^6$ .................................. C02F 1/62; C02F 1/56
[52] U.S. Cl. .................................. 210/732; 210/912
[58] Field of Search .................................. 210/735, 729, 210/732, 912

[56] References Cited

U.S. PATENT DOCUMENTS

| | | | |
|---|---|---|---|
| 4,238,328 | 12/1980 | Bowes et al. | 210/688 |
| 4,578,195 | 3/1986 | Moore et al. | 210/679 |
| 4,943,377 | 7/1990 | Legare, III | 210/709 |
| 5,015,560 | 5/1991 | Koboshi et al. | 430/398 |
| 5,164,095 | 11/1992 | Sparapany et al. | 210/735 |
| 5,205,939 | 4/1993 | Syrinek | 210/727 |
| 5,347,071 | 9/1994 | Moriya et al. | 588/256 |
| 5,387,365 | 2/1995 | Moriya et al. | 252/180 |

FOREIGN PATENT DOCUMENTS

| | | | |
|---|---|---|---|
| 0619272 | 10/1994 | European Pat. Off. | C02F 1/52 |
| 3-132656 | 6/1991 | Japan | G03C 7/44 |
| 6-118589 | 4/1994 | Japan | G03C 7/44 |
| 6-118594 | 4/1994 | Japan | G03C 11/00 |
| 6-258779 | 9/1994 | Japan | G03C 5/00 |
| 1395463 | 5/1975 | United Kingdom | C08G 16/02 |

OTHER PUBLICATIONS

Patent Abstracts of Japan, unexamined applications, P section, vol. 15, No. 349, Sep. 4, 1991 The Patent Office Japanese Government, p. 26, P 1247 for JP-A-03 132 656.

*Primary Examiner*—Neil McCarthy
*Attorney, Agent, or Firm*—Sughrue, Mion, Zinn, Macpeak & Seas

[57] ABSTRACT

A process for treating a photographic waste liquid containing a used processing liquid resulting from a processing step having a bleaching ability or a fixing ability in the processing of a silver halide photographic material which process comprises adding a polymer-complex-forming agent to the waste liquid in an amount in the range of from 0.5 to 4 equivalents to a metal contained in the waste liquid to thereby form a polymer-metal complex and then filtering off the polymer-metal complex with a mono-membrane filter having a pore size of 0.05 to 10 μm to thereby remove the metal. A device for use in practicing the process is also disclosed.

14 Claims, 6 Drawing Sheets

PROCESS FOR TREATING PHOTOGRAPHIC WASTE WATER

FIELD OF THE INVENTION

The present invention relates to a process for treating a photographic waste water resulting from the processing of a silver halide photographic material. More particularly, the present invention relates to a process for treating a photographic waste water containing a used processing chemicals resulting from a processing step having a bleaching ability or a fixing ability to easily remove a metal, e.g., silver, from the waste water at low cost with high removal efficiency.

BACKGROUND OF THE INVENTION

A silver halide photographic material (hereinafter also referred to as "photographic material") is processed, after exposure, through the steps of development, desilvering, washing, stabilizing, etc. In these steps, a developing bath, a bleaching bath, a bleach-fix bath, a fixing bath, industrial, municipal or deionized water, and a stabilizing bath are used to process the photographic material.

Such a processing is usually conducted using a processing apparatus, e.g., an automatic processor, in which the photographic material is transferred from one to another of processing tanks respectively filled with the aforementioned processing liquids.

Of these processing steps, a step having a bleaching ability or a fixing ability necessitates a subsequent washing or stabilizing step or the like in which a fixer ingredient, the silver complex and other chemiclas generated during fixing of the silver halide emulsion layers are washed out to maintain the stability of images. Therefore, those chemicals are incorporated into processing liquids, such as wash water and a stabilizing bath, and accumulated to a high concentration. Examples of such contaminants include silver complexes from the fixing bath; iron or silver compounds from the bleach or bleach-fix bath; cerium compounds from a reducer for photomechanical proces; aluminum compounds from a hardening fixer.

If a waste water containing such contaminants, e.g., silver compounds, are discharged directly into a sewer system, it causes an environmental safety problem. Particularly, in the United States, Europe, and some areas in Southeast Asia, regulations for the discharge of silver compounds into sewer systems are getting severe in recent years.

The collection and treatment of such waste water is costly, especially in large-scale photofinishing laboratories where wash water is used in large quantities. From the standpoint of resource conservation, the recovery of metals, e.g., silver, from waste water containing these metals at especially high concentrations is important. Furthermore, in most of the countries, only authorized transporter can transport the silver-containing hazardous waste.

From these standpoints, it is strongly desired to remove and simultaneously recover silver and other metals from the waste water described above.

Conventional methods for removing silver or other metals include metal displacement, precipitation (reduction or sulfiding precipitation), adsorption onto an ion-exchange resin, electrolysis, electrodialysis, and reverse osmosis. These methods, however, have been unsatisfactory in that they have various problems such as secondary pollution, insufficient efficiency of removal, complicated procedure, high initial cost, and high running cost.

Recently, methods for recovering silver, from a processing liquid having a fixing ability or from a waste wash water have been proposed which methods use a water-soluble polymer capable of complexing with the silver, in the waste water.

JP-A-3-132656, describes an effect that a large amount of silver ions accumulated in a processing solution having a fixing ability can be efficiently and easily removed by adding the water-soluble polymer to the used fixing bath to precipitate a water-insoluble silver complex and separate the precipitate by filtration to regenerate the used fixing bath and reduce in the amount of the processing liquid to be used. (The term "JP-A" as used herein means an "unexamined published Japanese patent application.") However, this method, when applied to the treatment of a fixing bath containing a large amount of accumulated silver ions, fails in removing the silver compounds to the level below regulation limit although the method removes silver to the level that allows fixer reuse. Further, when the above method is applied to a dilute solution having a low silver content, only a small proportion of the water-solublizing group in the polymer molecule reacts with silver, resulting little silver precipitation, consequently, the removal of silver is insufficient.

In Japanese Patent Application No.5-238945, on the other hand, a method for desilvering is proposed which comprises adding a water-soluble polymer to a waste washing water to precipitate the water-soluble polymer with which silver has coordinates and then separate the precipitate with an ultrafiltration membrane to remove the silver. However, this method has had the following problems. Since an ultrafiltration membrane (UF membrane) is used for separation of fine particles of the precipitate, the UF membrane is apt to suffer clogging and should hence be replaced frequently. Thus, maintenance is troublesome. In addition, the frequent replacement of expensive ultrafiltration membranes, results in an increased running cost.

SUMMARY OF THE INVENTION

The object of the present invention is to overcome the above-described problems of the conventional methods. That is, the object of the present invention is (1) to provide a process for treating a photographic waste water containing a liquid resulting from a processing step having a bleaching ability or a fixing ability in the silver halide photographic processing, by which a metal contained in the waste water can be easily removed at low cost with high accuracy, and (2) to provide a desilvering device for use in practicing the process that is, a waste treatment equipment for removing silver by the process described above and (3) an automatic processor for processing silver halide photographic materials having the built-in equipment.

The above-described objects of the present invention is accomplished with the following processes.

(1) A process for treating a photographic waste water containing a used processing liquid resulting from a processing step having a bleaching ability or a fixing ability in the processing of a silver halide photographic material which process comprises adding a complex-forming polymer to the waste water in an amount in the range of from 0.5 to 4 equivalents to a metal contained in the waste water to thereby form a polymer-metal complex and then removing the resultant silver precipitate.

(2) A process for treating a photographic waste water containing a used processing liquid resulting from a processing step having a bleaching ability or a fixing ability in the processing of a silver halide photographic material which process comprises adding a complex-forming polymer to the waste water in an amount in the range of from 0.5 to 4 equivalents to a metal contained in the waste water to thereby form a polymer-metal complex and then separating the polymer-metal complex with a single layer membrane filter having a pore size of 0.05 to 10 µm to remove the metal.

(3) The process for treating a photographic waste water as described in (1) or (2), wherein the complex-forming polymer comprises a water-soluble polymer ligand having a number-average molecular weight of from 50,000 to 500,000.

(4) The process for treating a photographic waste water as described in (1) or (2), wherein the complex-forming polymer comprises a hydrophilic linear polymer containing one sulfur atom in the recurring unit.

(5) The process for treating a photographic waste water as described in (4), wherein the hydrophilic linear polymer is a water-soluble linear polymer having dithiocarbamate functional group as the dominant water-solubilizing group.

(6) The process for treating a photographic waste water as described in (1) or (2), wherein the addition of the complex-forming polymer to the waste water is conducted at a temperature between 30° C. and 60° C.

(7) The process for treating a photographic waste water as described in (1) or (2), wherein the complex-forming polymer is added to the waste water in an amount in the range of from 0.8 to 3 equivalents to a metal contained in the waste water.

(8) The process for treating a photographic waste water as described in (1) or (2), wherein the complex-forming polymer is added to the waste water in an amount in the range of from 1 to 2.3 equivalent to a metal contained in the waste water.

(9) The process for treating a photographic waste water as described in (1) or (2), wherein the filtration with the single layer membrane filter is conducted while a pressure of 0.1 to 0.8 kg/cm$^2$ is uniformly applied throughout whole membrane surface of the filter unit.

(10) The process for treating a photographic waste water as described in (9), wherein the filtration with the single layer membrane filter is conducted with the flow rate of the waste water of from 30 to 1,000 ml/m$^2$·min.

(11). The process for treating a photographic waste water as described in (1) or (2), wherein the waste water is filtered through the precipitated layer of the polymer-metal complex formed on the single layer membrane filer and the amount of the precipitated layer is in the range of from 5 to 40 ml/m$^2$.

(12) The process for treating a photographic waste water as described in (1) or (2), wherein the concentration of the polymer-metal complex in the photographic waste water to which a complex-forming polymer has been added is determined by an optical analyzing means, and then polymer-metal complex is separated with a single layer membrane filter having a pore size of 0.05 to 10 µm to remove the metal.

(13) The process for treating a photographic waste water as described in (1) or (2), wherein the photographic waste water contains at least one compound selected from a silver compound, an iron compound, an aluminum compound, and a cerium compound.

(14) The process for treating a photographic waste water as described in (13), wherein the silver concentration in the waste water is from 0.5 to 200 ppm.

(15) The process for treating a photographic waste water as described in (13), wherein the silver concentration in the waste water is measured in advance and the amount of the complex-forming polymer to be added is determined based on the measured concentration.

(16) A desilvering device which comprises a silver-detecting means for measuring the concentration of silver in a photographic waste water, an addition-amount-determining means for determining the amount of a complex-forming polymer to be added based on the information obtained by the silver-detecting means, a silver-complex-forming means for adding the determined amount of the complex-forming polymer to the waste water to form a polymer-silver complex, and a filtering means for separating the polymer-silver complex with a single layer membrane filter.

(17) The desilvering device as described in (16), wherein the single layer membrane filter has a pore size in the range of from 0.05 to 10 µm.

(18) An automatic processor for a silver halide photographic material which processor has, a built-in desilvering device as described in (16).

DETAILED DESCRIPTION OF THE INVENTION

According to the present invention, it has surprisingly been found that when a complex-forming polymer is added to a metal-containing photographic waste water in an amount between 0.5 and 4 equivalents of the metal to form polymer-metal complex particles, followed by filtering the waste water through a single layer membrane filter having a pore size of 0.05 to 10 µm, the complex particles having even a size sufficiently small to pass through the pores of the single layer membrane filter used are prevented to pass through the filter. That is, the single layer filter can stop the-particles with the size of 1/10th to 1/100th of pore size of the single layer membrane filter, i.e., the membrane functions similarly to a UF membrane, in spite of the relatively simple operation.

Although the filtration mechanism mentioned above has not been fully elucidated, it is estimated as follows: A metal present in the waste water is trapped by the ligand in the complex-forming polymer to form a water-insoluble polymer-metal complex and is a precipitated. Since this precipitate has certain specific properties and has an appropriate particle size and particle size distribution, the precipitate is settled on a single layer membrane filter having a given pore size and form a new layer of the deposit which traps even very fine size fractions of the particles. The resulting membrane becomes to have a similar function to the complex membrane. As a result, even the particles of polymer-metal complex having a so small particle diameter that can be only separated by a UF membrane or a simillar membrane with molecular fractionation capability are prevented from passing through the single layer membrane filter.

Further, when the filtration treatment according to the present invention is conducted for a prolonged time period, the polymer-metal complex accumulates on the surface of the single layer membrane filter in an excessively large amount. However, the polymer-metal complex losely adheres to the filter surface, probably because the filtration in the present invention is conducted without applying a high water pressure (i.e., conducted at, e.g., 0.1 to 0.8 kg/cm$^2$). The excessively accumulated polymer-metal complex can hence be removed by a simple filter-cleaning operation without deteriorating the high filtering performance of the filter. Consequently, it is not necessary to frequently replace the filter and the maintenance of the filter is extremely easy. The precipitated polymer-metal complex is separated with a single layer membrane filter while a given pressure (0.1 to 0.8 kg/cm$^2$) is uniformly applied. As a result, the metal is efficiently and consistently removed.

Upon the addition of a complex-forming polymer to a silver-containing waste water, the precipitate generates in 5 to 100 minutes. It is necessary for efficiently conducting desilvering that the precipitate be separated after generation of a precipitate, with the single layer membrane filter (MF membrane). It is therefore preferable that the generation of the precipitate be detected by an optical analyzing means not the naked eye before the waste water is filtered through a single layer membrane filter. This detecting method facilitates automatization of the process of the present invention.

The photographic waste water used in the present invention contains a used processing liquid resulting from the processing step having a bleaching ability or a fixing ability. The silver concentration in the waste water is from 0.5 to 200 ppm, preferably from 1 to 60 ppm, more preferably from 2 to 30 ppm. Further, the concentration of iron in the waste water may be from 0.5 to 200 ppm, preferably from 2 to 100 ppm, that of aluminum may be from 0.5 to 200 ppm, and that of cerium may be from 0.5 to 200 ppm.

When the waste water used in the present invention contains silver, the silver concentration in the waste water is measured and a complex-forming polymer is added in an amount corresponding to the silver amount. As a result, efficient desilvering is always possible even when the silver concentration in the waste water fluctuates, and this enables a consistent continuous treatment.

By incorporating a silver-detecting means for determining the concentration of silver in the photographic waste water, an addition-amount-determining means for determining the amount of a complex-forming polymer to be added based on the information obtained by the silver-detecting means, a silver-complex-forming means for adding the determined amount of the complex-forming polymer to the waste water to form a polymer-silver complex, and a filtering means for filtering the resulting waste water into an automatic processor for a silver halide photographic material, an automatic processor can be provided with which the desilvering treatment of the waste water can be continuously performed therein always consistently even in photofinishing laboratories without the necessity of the treatment of the waste water, thereby giving a treated waste water dischargeable into public waters.

By the same process as described above, the iron, aluminum, or cerium contained in a waste water can be removed. Thus, the concentration of metallic elements in the waste water can be reduced.

The constitutions of the present invention are explained below in detail.

In the process of the present invention, a waste water containing a used processing liquid resulting from a processing step having a bleaching ability or a fixing ability is brought into contact with a complex-forming polymer to form a water-insoluble polymer-metal complex, and this waste water is filtered through a single layer membrane filter having a given pore size to deposit the polymer-metal complex on the filter surface to thereby permit the filter to function similar to a UF membrane and desilver the waste water.

The complex-forming polymer used in the present invention is usually a polymer ligand. This polymer ligand is a complex which has a functional group used in a so-called chelate resin and is water-soluble. Hence, it readily dissolves into a waste water and attacks a complex, e.g., silver thiosulfate or an iron salt of ethylene diamine tetraacetic acid, to react with the central metal, i.e., silver, ah iron, etc. As a result, an insoluble polymer-complex of silver, iron, etc. forms and precipitates. Thus, this water-soluble polymer functions to form a complex upon coordination with a metal and selectively collect ions of a metal, e.g., silver, present in the waste water.

In this case, the polymer-metal complex formed is water-insoluble. When the metal chelated has a valence of two or higher, the polymer-metal complex is mostly a chelate polymer having metal chelate structures formed within or between polymer molecules. However, the polymer-metal complex may be a polymer formed by the mere coordination of the metal without forming a chelate ring.

In the polymer ligand described above, the coordinating atom is desirably nitrogen or sulfur in the case of forming a complex with a metal. Examples of polymer ligands having such a coordinating atom are given in Yoshimasa Hōjō, "Chelate Resin • Ion-Exchange Resin," Kōdansha Scientific pp. 8–20 (1976) and references cited therein.

A polymer ligand containing sulfur as a coordinating atom is preferred in the present invention. Especially preferred are polymer ligands having a dithiocarbamic acid group, a derivative thereof (—NH—CS$_2$M), a thiol group, or the like as a coordinating group.

These coordinating groups are preferably water-soluble. Preferred examples of the above M include a hydrogen atom, alkali metals, e.g., sodium, alkaline earth metals, e.g., calcium, metal cations, e.g., an aluminumion, and, in some cases, onium ions.

The number of coordinating groups per molecule is 1 mol or more, desirably from 10 to 250 mol. The number of coordinating groups per g of the polymer ligand is desirably from 0.1 to 50 meq (milliequivalent).

Due to the possession of such a water-soluble coordinating group, the complex-forming polymer is apt to react with a metallic element present in the processing liquid to improve the efficiency of the removal of the metallic element, especially silver. Such a polymer ligand is preferably used as an aqueous solution. The concentration of the complex-forming polymer in its solution to be added is preferably about from 2 to 80 wt % from the standpoint of easiness of addition. The complex-forming polymer is added in such an amount that the concentration thereof in the waste water is on the order of 0.1 to 1,000 ppm although it varies depending on the amount of the metal contained in the waste water.

The number-average molecular weight of the polymer ligand is 50,000 or higher and below 500,000, preferably from 100,000 to 200,000. The polymer ligand preferably has such a molecular weight distribution that molecules having a number-average molecular weight of 10,000 or lower account for at most 5 wt % of all the molecules, from the standpoint of attaining a further reduction in the metal concentration in the water which has passed through the filter (filtrate water).

The polymer ligand for use in the present invention preferably has a solubility in 100 g of water of 1 g or higher, preferably from 40 to 900 g.

Preferred examples of the polymer ligand for use in the present invention are given below, but the ligand should not be construed as being limited thereto. In the formulae, M has the same meaning as defined above, R represents a hydrogen atom, a methyl group, an ethyl group, or a propyl group, and k, m, and n each represents a positive integer, each of which is preferably in a range of from 100 to 5000.

Besides the above ligands, similar water-soluble polymer ligands are commercially available under the trade names of, e.g., Epofloc L-1 and L-2 (manufactured by Miyoshi Oil & Fat Co., Ltd.), Santhiol NW (manufactured by Nakagawa Kagaku Sochi K.K.), and Gospel M-9 and M-10 (manufactured by Gospel Kako K.K.).

The complex-forming polymer for use in the present invention is added in an amount in the range of from 0.5 to 4 equivalents preferably 0.8 to 3 equivalents, more preferably from 0.5 to 2.7 equivalents, furthermore preferably from 1 to 2.3 equivalents, to a metal (especially silver) contained in the waste water. If the amount thereof is smaller than 0.5 equivalent, a large proportion of the metal ions (especially silver ions) remain uncoordinated with the complex-forming polymer, resulting in a filtrate containing the metal (especially silver) remaining unremoved in a larger amount. If the amount thereof exceeds 4 equivalents, the amount of the metal (especially silver) coordinated per molecule of the complex-forming polymer is small and, hence, the polymer-metal complex formed does not precipitate and passes through the filter, resulting in insufficient metal removal.

In the case where the metal contained in the waste water to be treated in the present invention is silver, the discharge of which is the most strictly regulated, it is preferred to measure the silver concentration in the waste water with a silver-detecting means and to determine the amount of the complex-forming polymer to be added according to the measured concentration. This method enables an always satisfactory and continuous desilvering treatment even when the silver concentration in the waste water fluctuates.

The complex-forming agent for use in the present invention may be a low-molecular multidentate ligand which, upon coordination with a metal, forms a polymer, i.e., a polymer-metal complex.

The polymer-metal complex thus formed has a number-average molecular weight of 1,000 or higher, preferably from 5,000 to 20,000. When the metal contained in the waste water is silver, the amount of the silver collected is about from 0.1 to 0.7 g per g of the precipitated polymer-silver complex. When the metal contained in the waste water is iron, aluminum or cerium, the amount of the iron, aluminum or cerium each collected is about 0.02 to 0.4 g, 0.02 to 0.4 g and 0.07 to 1 g per g of the precipitated poymer-metal complex, respectively.

The used processing liquid resulting from a processing step having a bleaching ability or a fixing ability, in the present invention, means a cleaning liquid, such as washing water or stabilizing bath, used in photograph processing. A cleaning step using a cleaning liquid is explained below.

A cleaning step is a treatment for washing off agents contained in a silver halide photographic material which has undergone a processing step involving a chemical reaction. This cleaning step includes both a cleaning step conducted in the middle of the photograph processing and a cleaning step conducted as the final step. Specifically, the steps called washing, stabilizing, rinsing, and the like are included.

In this cleaning step, ordinary water such as city water or well water is basically used. However, since the cleaning step functions to wash out agents which were contained in the preceding bath and have come into the photographic material, the cleaning liquid, in some cases, may be deionized water or may contain a slight amount of a compound which functions to enable a residue of the preceding bath to be washed off easier, a compound which serves to improve the storage stability of the photographic material after processing, a compound which functions to inhibit bacterial growth in the water, etc.

In the case of using water, the photographic material may be washed with a large amount of water (generally called "washing"), or may be washed with water corresponding to the replenishment of the processing liquid used with the photographic material (generally called "rinsing bath washing"). In some cases, washing with water in a tub with water replenishing may be included.

On the other hand, in the case of using water containing a certain kind of compound in a small amount (generally called "stabilizing bath," etc.), the compound and amount described in JP-A-2-242249 (p. 4) are preferred. From the standpoint of the cost of chemicals, it is generally preferred that the cleaning liquid containing a slight amount of this compound be replenished on the same level as processing-liquid replenishing.

The chelating agent described in JP-A-2-262141 is also usable as a compound which improves cleaning effect in an intermediate cleaning step.

There are desirably the following relationships between washing and rinsing in the present invention concerning replenishment amount, treating period, and the number of tanks.

The replenishment amount for washing is desirably at least 1.5 times, preferably at least 2 times, that for rinsing. In each of washing and rinsing, the number of tanks is desirably from 2 to 4 and the treatment is desirably conducted with counter-current replenishing.

Specifically, the replenishment amount for washing is from 400 ml to 2,000 ml, desirably from 500 ml to 1,000 ml, per $m^2$ of the photographic material, while that for rinsing is 200 ml or smaller, desirably 100 ml or smaller, per $m^2$ of the photographic material. The replenishment amount in stabilization is desirably 1 liter or less per $m^2$ of the photographic material.

Processing liquids for use in a cleaning step are explained below.

As stated above, the washing water, stabilizing bath, or the like for use in a cleaning step consists basically of tap water or ion-exchanged water. Known additives may be incorporated into the water if desired and necessary.

For example, chelating agents, e.g., inorganic phosphoric acids, aminopolycarboxylic acids, and organic phosphoric acids, germicides for preventing the growth of various bacteria and algae, fungicides, hardening agents, e.g., magnesium salts and aluminum salts, surfactants for eliminating the occurrence of drying stress or drying marks, brightening agents for improving whiteness, and preservatives, e.g., sulfites, and the like may be used. Also, the compounds given in, e.g., L. E. West, "Water Quality Criteria" *Phot. Sci. and Eng.*, Vol. 9, No. 6, pp. 344–359 (1965) are usable.

As the stabilizing bath, a processing liquid containing an ingredient which serves to stabilize dye images is used. For example, a bath which shows a buffering ability at a pH of 3 to 6 or a bath containing an aldehyde (e.g., formalin) may be used. If desired and necessary, a brightening agent, chelating agent, germicide, fungicide, hardening agent, surfactant, or the like may be added to the stabilizing bath.

The pH of the washing water or stabilizing bath is usually around 7, but it can vary in the range of from 3 to 9 as a result of inclusion from the preceding bath. The temperature for washing or stabilization is from 5° C. to 40° C., preferably from 10° C. to 36° C. If desired and necessary, the washing tanks or stabilization tanks may be provided with a heater, temperature controller, circulating pump, filter, floating cover, squeegee, or the like. The above applies also to a rinsing liquid.

With respect to details of photograph processing, reference may be made to descriptions in JP-A-3-46652.

For contacting a photographic waste water with a complex-forming polymer, any method may be used as long as the above both can be mixed sufficiently. Examples of contacting methods include mixing with a static mixer disposed in the piping and mixing in a stock tank. In a preferred method, the photographic waste water and the solution of the complex-forming polymer are poured into a vessel, e.g., a stock tank, and the mixture is continuously stirred therein with a stirring means over a given period. As a result, the metal (especially silver) contained in the waste water is almost completely come into sufficient contact with the complex-forming polymer and the formation of a polymer-metal complex becomes perfect. For ascertaining whether the formation of a polymer-metal complex has become perfect, the naked eye may be used. However, use of an optical analyzing means is preferred. By the use of an optical analyzing means, a device for use in practicing the process of the present invention can be automatized. A conventional densitometer or the like may be used as the optical means. Examples of the optical means include a densitometer for soybean milk (SM-20 manufactured by Amago K.K.), a turbidimeter, and a spectrometer (Autounic UN-5, manufactured by Atago K.K.; 301, manufactured by Photomeck Co.; or SP-21 or SP-20 manufactured by Hitachi Ltd.). When the concentration measured with any of these densitometer, turbidimeter, and spectrometer or the like has exceeded a given value, the waste water is transferred to a filtering means. The given concentration value varies depending on various conditions and is determined for each case. For example, the process is regulated so that a waste water having a concentration as determined with a turbidimeter of 0.23 is introduced into a filtering means when the concentration thereof has exceeded 0.5.

The contact of a photographic waste water with a complex-forming polymer is preferably performed with heating. Specifically, heating to around 30° to 60° C. accelerates the formation of a polymer-metal complex and, hence, enables a reduction in the time required for contacting and stirring. That is, the time for contacting and stirring can be set at about 20 seconds or less.

As the single layer membrane filter for use in the present invention for separating the polymer-metal complex, any inexpensive filter membrane which does not have a multi-layer structure such as that of a UF membrane or an RO (Reverse Osmosis) membrane and can be produced easily may be used in the present invention as long as it has a pore size of from 0.05 to 10 μm, preferably from 0.1 to 3 μm, more preferably from 0.2 to 1 μm.

The material of the filter is not particularly limited, and an inexpensive polymer such as, e.g., poly(vinyl chloride), polyethylene, polypropylene, or polybutylene is sufficient. If desired and necessary, however, an expensive polymer such as a polysulfone or polyacrylonitrile may be used.

Examples of the single layer membrane filter include a porous single layer membrane polymer filter and a single layer membrane ceramic filter. A pulp fiber filter is also usable in some cases.

Examples of the polymer constituting the porous single layer membrane polymer filter include poly(vinyl chloride), polyethylene, polypropylene, polybutylene, polysulfones, and polyacrylonitrile.

Examples of the ceramic constituting the single layer membrane ceramic filter include porous glass, biscuit plate, magmatite plate, and foamed nitrides.

Examples of the pulp constituting the pulp fiber filter include ordinary filter papers No. 5A and No. 5C.

Of the aforementioned filters, the porous single layer membrane polymer filters are preferred from the standpoints of light weight and easiness of filter production. Exemplary commercial products of these filters include various Yumicron membranes manufactured by Yuasa K.K., Millipore filters manufactured by Millipore Corp. (e.g., Millipore AA, DA, HA, PH, GS, FG, UC, UM, US, GU, and HP), precision filters manufactured by Kuraray Co., Ltd. (SF-301, SF-101, and SF-401), and Gore-Tex membranes manufactured by Gore-Tex Co.

Recently developed fiber filters made of 0.01-denier fibers (nylon, polypropylene, or polyethylene) are also usable.

Of these filters, the Yumicron systems manufactured by Yuasa K.K. are easy to use because filtration therewith is possible even when the pressure applied is low. Although the Yumicron membranes used in these systems have a pore size of 0.45 μm, filtration of the waste water containing a precipitate formed from a water-soluble complex-forming polymer having an average molecular weight of 100,000 to 150,000 and a metal (especially silver) does not result in permeation of the metal through the filter into the filtrate because the metal is trapped by the complex-forming agent.

Single layer membrane filters having a pore size smaller than 0.05 μm are so difficult to produce that such a pore size is usually attained only when they have a multilayer structure. The single layer membrane filters having such a small pore size is therefore costly and further has a drawback that much filtration time is needed due to filter clogging. On the other hand, if a filter having a pore size exceeding 10 μm is used, relatively small precipitate particles of the polymer-metal complex pass through the filter, resulting in insufficient metal removal.

The following single layer membrane MF Filters are preferably used in the present invention.

The single layer membrane MF filter that can be used in the present invention is a single layer membrane filter in which the ratio ($S_2/S_1$) of the area of the filter membrane surface ($S_2$) to the area of the filter opening ($S_1$) is from $10^3$ to $10^5$. That is, the filter is fixed at its opening, with the membrane surface of the filter being left unfixed. Consequently, the single layer membrane filter for use in the present invention has a degree of fixation of below 0.1%, that is, a degree of non-fixation of 99.9% or higher.

In the present invention, the liquid obtained by adding a complex-forming polymer to a silver-containing liquid to precipitate the silver is preferably filtered at a pressure of 1 kg/cm² or lower with a single layer membrane MF filter in which at least 75% of the filter membrane surface is left unfixed and the filtering surface is vibrationable and which has an $S_2/S_1$ ratio (where $S_2$ is the area of the filter membrane surface and $S_1$ is the area of the filter opening) of from $10^2$ to $10^6$, preferably from $10^3$ to $10^5$. This filtration treatment effectively removes silver to an extraudinary low silver concentration.

Figure 4A:
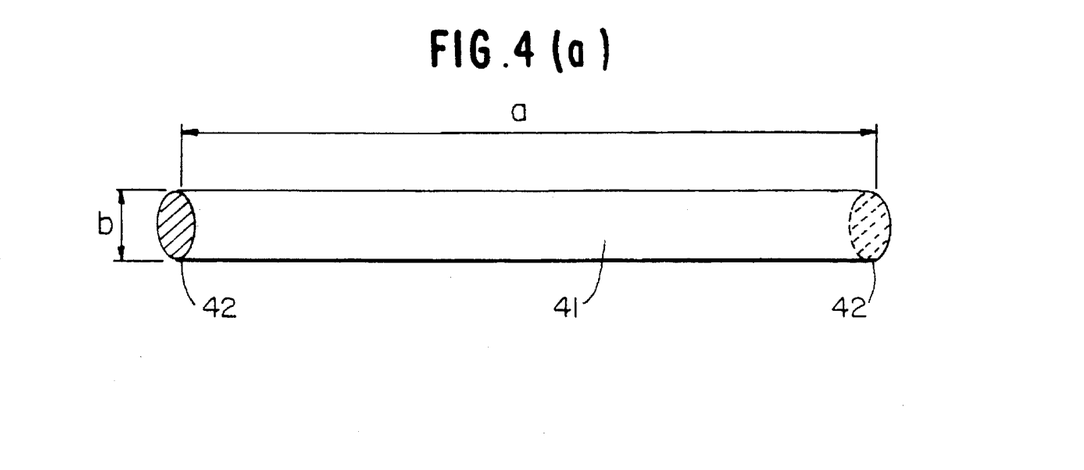
FIG. 4 is an example of the single layer membrane MF filter which are preferred for use in the process of the present invention.
Figure 4B:
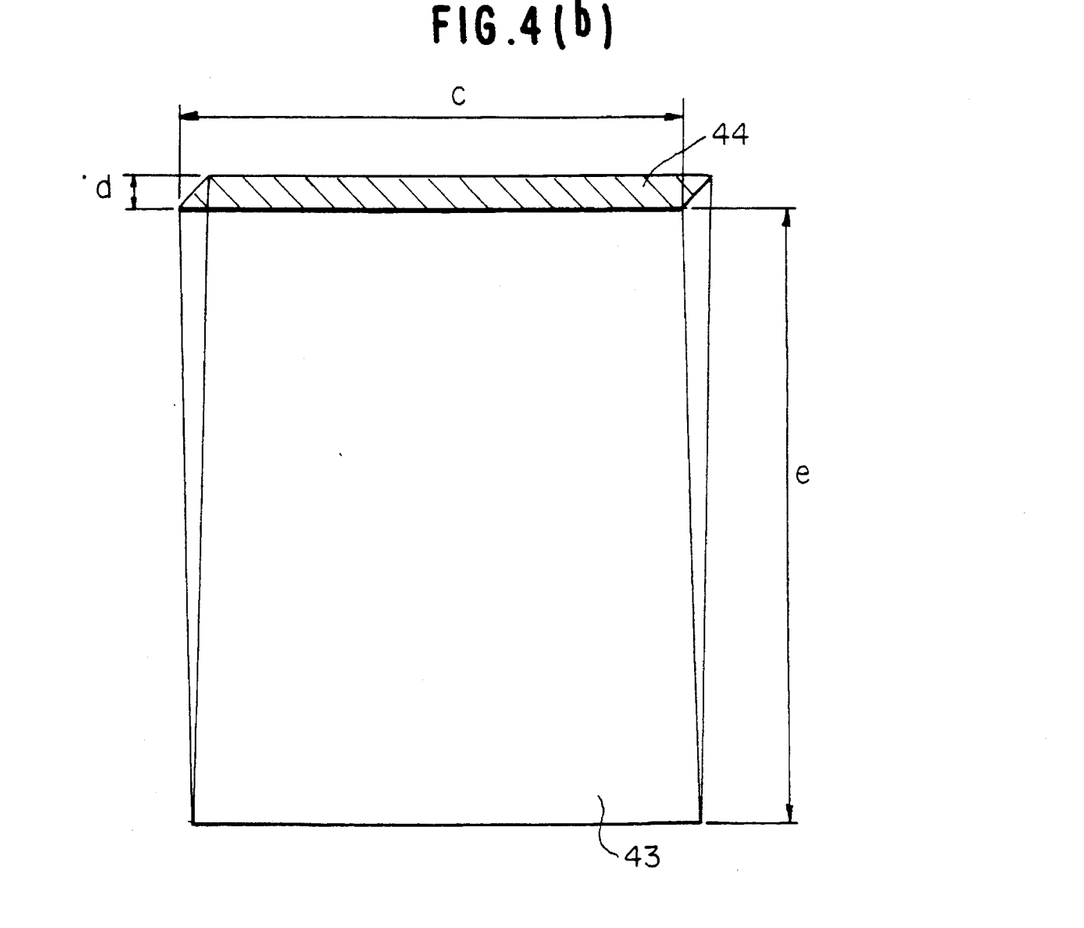
Figure 5:
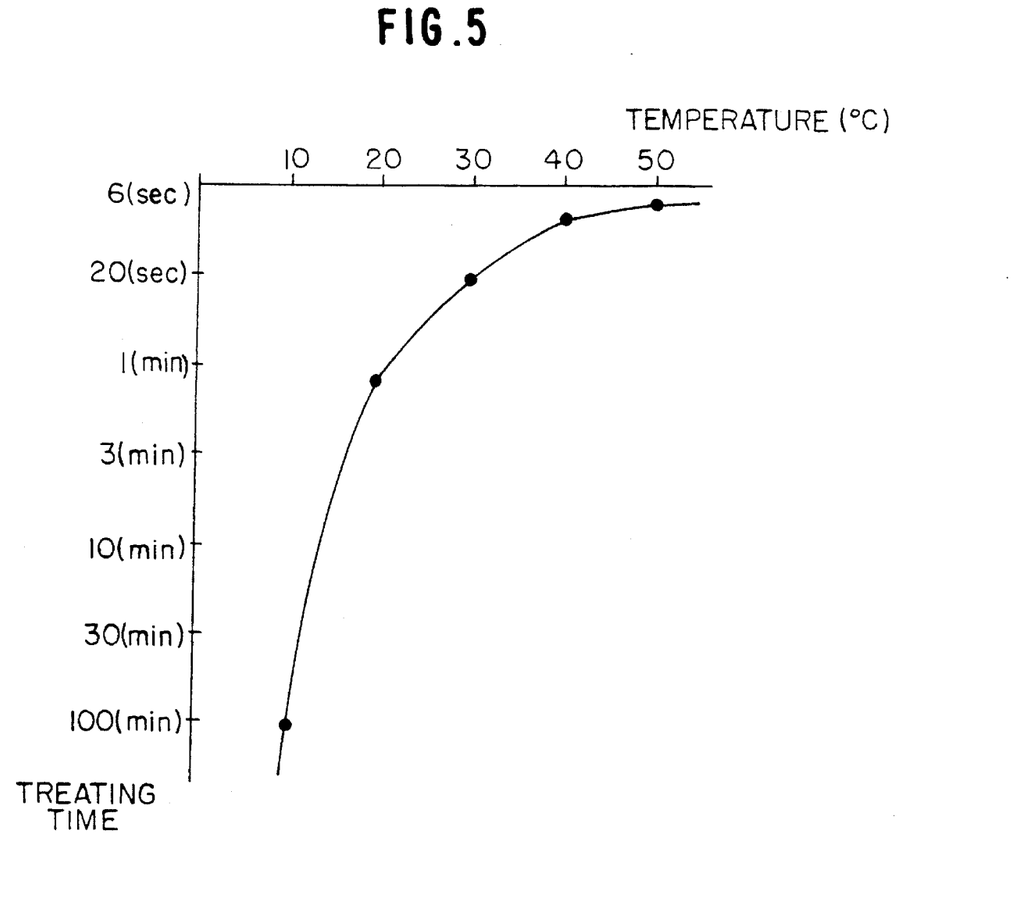
FIG. 5 is a graph showing the relationship between temperature and treating time in the process of the present invention.

Embodiments of the single layer membrane MF filter that can be used in the present invention are shown in FIG. 4, (a) and (b).

FIG. 4(a) shows a cylindrical hollow fiber filter comprising a vibrationable filter membrane part 41 and fixed parts 42 each having an opening. FIG. 4(b) shows a bag-form filter comprising a vibrationable filter membrane part 43 and a fixed part 44 having an opening.

In a filter in which the area of the filter membrane surface, $S_2$, is at least 1,000 times the area of the filter opening, $S_1$, the minute opening part only is fixed and the remainder of the filter is left unfixed. That is, a filter in which the proportion of the fixed-part area (degree of fixation) is below 0.1% is a vibrationable filter. The upper limit of $S_2/S_1$ is $10^5$. If that ratio exceeds $10^5$, such a filter is difficult to produce. The relationship between $S_2$ and $S_1$ is explained below using given size values with respect to the filters shown in FIG. 4.

In the hollow fiber filter shown in FIG. 4(a), when a is 20 to 200 cm and b is 1 mm, then $S_1$=1 mm²=0.01 cm², $S_2$=12.6 cm² to 126 cm², $S_2/S_1$=1,260 to 12,600.

In the bag-form filter shown in FIG. 4(b), when e is 100 cm, c is 50 cm, and d is 1 mm, then $S_1$=0.1×50=5 cm², $S_2$=100×50×2=10,000 cm², $S_2/S_1$=2,000.

Thus, $S_2/S_1$ is preferably from $10^3$ to $10^5$.

A filter having a vibrationable filter surface means an MF filter which is a 0.01 μm- to 10 μm-thick single layer membrane (which is not a multi-layered membrane as a UF membrane or RO membrane) filter having a filtering surface capable of being easily vibrated by aeration or another means, and which is in the form of a hollow fiber or a bag, with one or two sides thereof being fixed and two or three sides thereof being left unfixed.

The filter is disposed in a filtration tank in such a state that part of the filter is fixed or part of the filter is vibrationable. A filter which is not fixed partly cannot be disposed in an active sludge. A filter which is partly vibratory can be used as it is over long period without maintenance because the deposition of active-sludge particles or other suspended particles on the fiber membrane surface is little.

An example of vibrating means is bubbling. By performing filtration while bubbling air into the filtration tank through an air inlet, filter clogging can be prevented and the filtration efficiency can be improved.

Especially preferred for use in the present invention are a hollow fiber single layer membrane MF filter and a bag-form single layer membrane MF filter.

Examples of the hollow fiber MF filter include Sterapore STNM 424 (polyethylene; pore diameter, 0.1 μm) manufactured by Mitsubishi Rayon Co., Ltd., Kuraray SF filter (poly(vinyl alcohol); pore diameter, 0.1 μm) manufactured by Kuraray Co., Ltd., SR-205 (polyolefin; pore diameter, 0.1 μm) manufactured by Asahi Chemical Industry Co., Ltd., and E202AE (fluororesin; pore diameter, 0.2 μm) manufactured by Nitto Electric Industrial Co., Ltd. Among them, the filters made of a soft material are preferred because such filters can be easily vibrated by air bubbling. In general, filters made of polyethylene or polypropylene are preferable. These filters are available as either both-ends-fixed hollow fibers or one-end-fixed hollow fibers, but the former type is preferable from the standpoints of stable operation and easiness of use.

The hollow fiber single layer membrane MF filter, for example, has a pore diameter of from 0.01 to 3 μm, preferably from 0.03 to 2 μm, more preferably from 0.05 to 1 μm. Preferred examples thereof include Kuraray SF filter (poly(vinyl alcohol)) with a pore diameter of 0.1 μm manufactured by Kuraray Co., Ltd., SR-205 (polyolefin) with a pore diameter of 0.1 μm manufactured by Asahi Chemical Industry Co., Ltd., E202AE (fluororesin) with a pore diameter of 0.2 μm manufactured by Nitto Electric Industrial Co., Ltd., and Sterapore STNM 424 (polyethylene) with a pore diameter of 0.1 μm manufactured by Mitsubishi Rayon Co., Ltd. Especially preferred is Sterapore STNM 424 (polyethylene) with a pore diameter of 0.1 μm manufactured by Mitsubishi Rayon Co., Ltd.

Examples of the bag-form filter include YC-25 (PVC; pore diameter, 0.45 μm), YC-50 (PVC; pore diameter, 0.45 μm), and YC-100 (PVC; pore diameter, 0.45 μm) all manufactured by Yuasa Corp. This bag-form filter is stable to vibration and can be effectively vibrated, since this filter is fixed at one side thereof, with the remaining three sides being left unfixed. This filter contains coarse-mesh spacers between the paired bagwalls and has embossing on the filter surface. By vibrating these spacers, the vibration can be effectively transferred to the filter bags while rubbing the filter surface, so that the deposition of the precipitate on the embossed filter surface can be prevented throughout the filtration.

Preferred examples of the bag-form single layer membrane MF filter include YC-25 (25 $m^2$) with a pore diameter of 0.45 μm, YC-50 (50 $m^2$) with a pore diameter of 0.45 μm, and YC-100 (100 $m^2$) with a pore diameter of 0.45 μm all manufactured by Yuasa Corp. Although these filters are suitably used for different purposes, YC-50 is especially preferred from the standpoints of cost and maintenance.

There are various kinds of hollow fiber single layer membrane MF filter as enumerated above. However, those made of polyethylene or polypropylene are preferred in the present invention because such membranes well vibrate upon air bubbling.

For conducting filtration in the present invention, any method may be used as long as the polymer-metal complex is sufficiently caught by the filter in a relatively short time. The filtration is preferably performed in a closed system while a pressure of 0.1 to 0.8 $kg/cm^2$ is uniformly throughout whole membrane surface of the filter unit applied. The even application of such a pressure herein means the technique of applying the pressure not perpendicularly but parallel to the filter plane to thereby conduct filtration without applying a high pressure to the filter (cross-flow filtration). By employing this filtration technique, improved filtration performance with little filter clogging is attained and stable filtration in a continuous processing is possible. The flow rate of the waste water is 30 to 1,000 $ml/m^2 \cdot min$ although it varies depending on the filtering device, and a treating rate of 1 to 30 BV/hr is necessary.

In the filtration using the filter described above, passing the waste water through the filter once is sufficient. In some cases, however, the waste water may be passed through two or more filters once or circulated through one or more filters, or may be filtered in another way.

The shape and size of the filter for use in the present invention may be suitably selected according to the purpose, use, etc. In a preferred method, a bag-form or hollow-fiber membrane filter having a large filtration area is used, and the liquid to be treated is passed from the outside to the inside of the filter, with the filtrate being discharged from the inside. This filter is desirably used with application of a pressure of from 0.1 to 0.8 $kg/cm^2$ to the outside of the filter or with suction from the inside of the filter (−0.1 to −0.8 $kg/cm^2$). This filter is preferred in that since the proportion of the unfixed part thereof is larger than that of the fixed part, the filter can be vibrated during filtration.

In the present invention, in order to give a performance similar to that of an ultrafiltration membrane as described above to the large-pore size filter, it is necessary to prefiltrate the waste water containing the precipitated polymer-metal complex for a while. Although the duration for this prefiltration varies depending on the kind of the filter used, filtering the waste water until 5 to 40 ml of the precipitate of the polymer-metal complex deposits per $m^2$ of the filter surface produces the effect of the present invention. It is preferred that the waste water for prefiltration contains a precipitate formed by the reaction of silver with a water-soluble complex forming polymer having a linear structure with a molecular weight of 100,000 to 500,000. It is further preferred that the above polymer is a water-soluble linear polymer having dithiocarbamate functional group as the dominant water-solublizing group.

Since the filtration described above results in precipitate deposition on the filter, the deposit should be recovered. This deposit is a highly valuable sludge containing silver, and hence may, for example, be handed over to reclamation interests.

On the other hand, in the liquid in the washing or stabilizing tank located next to a processing tank having a fixing ability, e.g., a fixing tank, silver ingredients including a silver complex which have been washed off from the emulsion layers of a photographic material are present in a considerably high concentration. This silver concentration is about 0.5 to 200 ppm under ordinary replenishment conditions, although it varies depending on the kind of the photographic material. The silver concentration in all the waste water including washing water and stabilizing bath is usually 1 to 60 ppm.

When such a waste water is treated in the present invention, the filtrate has a reduced silver content of 10 ppm or lower, usually 0.001 to 1 ppm. It is possible to further reduce the silver concentration in the filtrate to 0.001 to 0.1 ppm. By reducing the silver concentration in the filtrate to below 1 ppm, the silver discharge regulations in about 80% of the regions in the United States and Europe can be cleared. When the silver concentration is reduced to below 0.1 ppm and to below 0.01 ppm, the silver discharge regulations in about 99.9% and 100%, respectively, of those regions can be cleared. That is, by treating a waste water with the above-described filtering means as it is or with a similar filtering means containing two or more filters arranged in series, the waste water can be converted to a filtrate which is dischargeable as it is into a sewer system or a river even in those regions in the United States where the most severe silver discharge regulations are adopted (e.g., Houston Tex. and Kileen Tex. where Ag<0.05 ppm; Addison Ill. where Ag<0.03 ppm; Anchorage Ak. where Ag<0.02 ppm) and in European countries adopting severe silver discharge regulations (e.g., Swiss where Ag<0.01 ppm; the Niers River, Germany where Ag<0.008 ppm). As a result, reclamation cost can be reduced.

Besides silver, the metals contained in the waste water and removable by the present invention include cerium, aluminum, and iron. In the case of removing cerium, aluminum, or iron, a complex-forming polymer is added to the waste water in such an amount that the molar ratio of the adsorbing functional groups contained in the complex-forming polymer to the cerium, aluminum, or iron is from 0.5 to 4. In the case where two or more of silver, cerium, iron, and aluminum are present, the complex-forming polymer is added in such an amount that the molar ratio of the adsorbing functional groups contained in the complex-forming agent to all the metals is from 0.5 to 20, in order that the silver, whose discharge regulations are the most sever, be removed almost completely and the remaining metal(s) be also removed. However, when priority is given to silver alone, that molar ratio may be from 0.5 to 4. This is because silver is the most readily adsorbed among these metals.

In the case where the process of the present invention is applied to a waste water resulting from washing after fixing, the filtrate which has passed through the filter may be reused, for example, as the water for dissolving a fixing agent therein. This is because when a precipitate is formed from a complex-forming polymer and silver and this precipitate is separated with the filter, then the dyes and surfactants contained not only in the fixing bath but also in the subsequent washing water are also removed and part of the fixing agent remains in the filtrate.

One embodiment of a device that can be used in the process of the present invention is explained by reference to a drawing.

The process of the present invention is explained by reference to FIG. 1, which shows the process applied to the removal of silver from a waste cleaning liquid resulting from the processing of a color negative film which waste water is an over-flow liquid from one of washing tanks W2 next to a fixing tank N3.

A photographic material is developed, bleached, and then washed in a developing bath N1, a bleaching bath N2, and washing tanks W1, respectively. The resulting photographic material is sent to the fixing tank N3, where fixing is conducted, and then sent to the washing tanks W2 and finally processed in a stabilizing bath N4. The washing after the processing in the fixing tank N3 is performed by 3-tank cascade washing, and the over-flow waste water from the first of the washing tanks W2, i.e., from the washing tank immediately after the fixing tank N3, is introduced into a stock tank 1 through a piping. For the introduction of the waste water into the tank 1, a pump P may be used and the flow rate of the waste water can be regulated with the pump.

A solution of a complex-forming polymer stored in a tank 2 is injected into the stock tank 1 with a pump P to bring the two liquids into contact with each other. Thus, a silver-complex-forming means is constituted of the pump for the waste water, the pump for the solution of a complex-forming polymer, the tank 1, etc. The stock tank 1 may have a stirring means. It is preferred to provide the stock tank 1 in its upper part with an air outlet packed with a deodorizer, e.g., active carbon.

The liquid mixture in the stock tank 1 which mixture contains a precipitate is sent through a piping and a pump P to a filtering device 3 as a filtering means, where the precipitate of a polymer-silver complex is filtered off. The resulting filtrate may be discharged.

Figure 2:
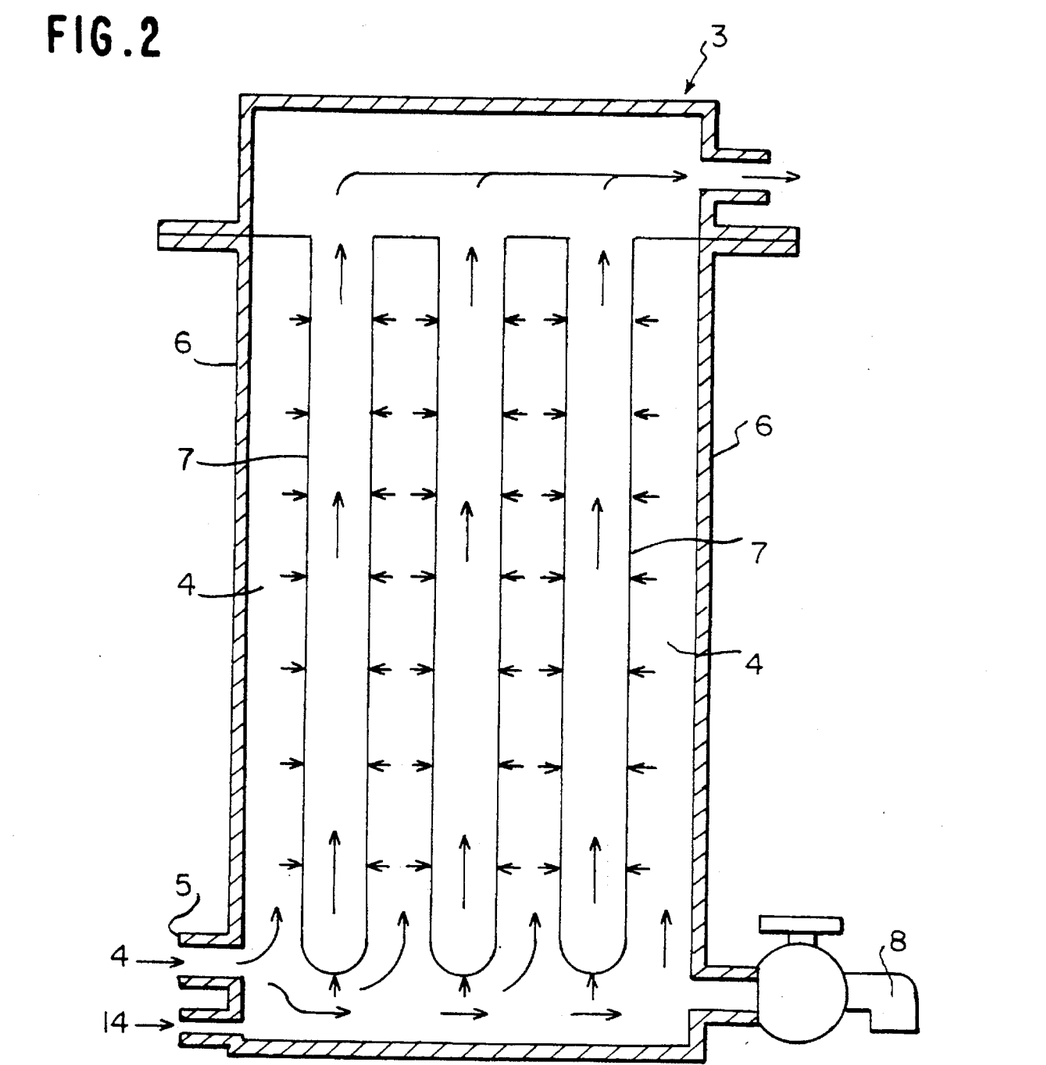
FIG. 2 is a sectional view of a filter unit for use in the process of the present invention.

An example of the filtering device 3 is explained by reference to FIG. 2 which is a schematic sectional view of the example. A waste water 4 is injected through a waste-liquid inlet 5 formed in a left-side lower part of the device, and passes through a lamellar filter 7 having the shape of bags and disposed in a closed casing 6. Thus, the waste water 4 is filtered. The filtrate is discharged from a right-side upper part of the device along the direction indicated by arrows in FIG. 2. The pressure within the filtering device can be regulated with the pump P.

The sludge of the polymer-silver complex adherent to the filter in the filtering device is removed upon occasion when the gauge pressure has exceeded 0.8 kg/cm$^2$. If the pressure gauge comes to increase frequently, the filter may be cleaned by bubbling such as, e.g., aeration. The sludge may be discharged from a sludge outlet 8 shown in FIG. 2.

A silver-detecting means for determining the silver-ion concentration in the waste washing liquid which has overflown may be disposed either in the piping through which the waste water is introduced into the stock tank 1 or in the waste water which has been introduced into the tank. The silver-detecting means determines the amount of silver, and a complex-forming polymer is added in an amount of 0.5 to 4 mol per mol of the silver (i.e., 0.5 to 4 equivalents to the silver) thus determined. Any silver-detecting means may be used here. However, the silver-ion sensor described in JP-A-6-27623 or Japanese Patent Application No. 5-72929 is preferred which measures the potential attributable to the thiosulfate ions present in the waste water to determine the silver-ion concentration.

Figure 3:
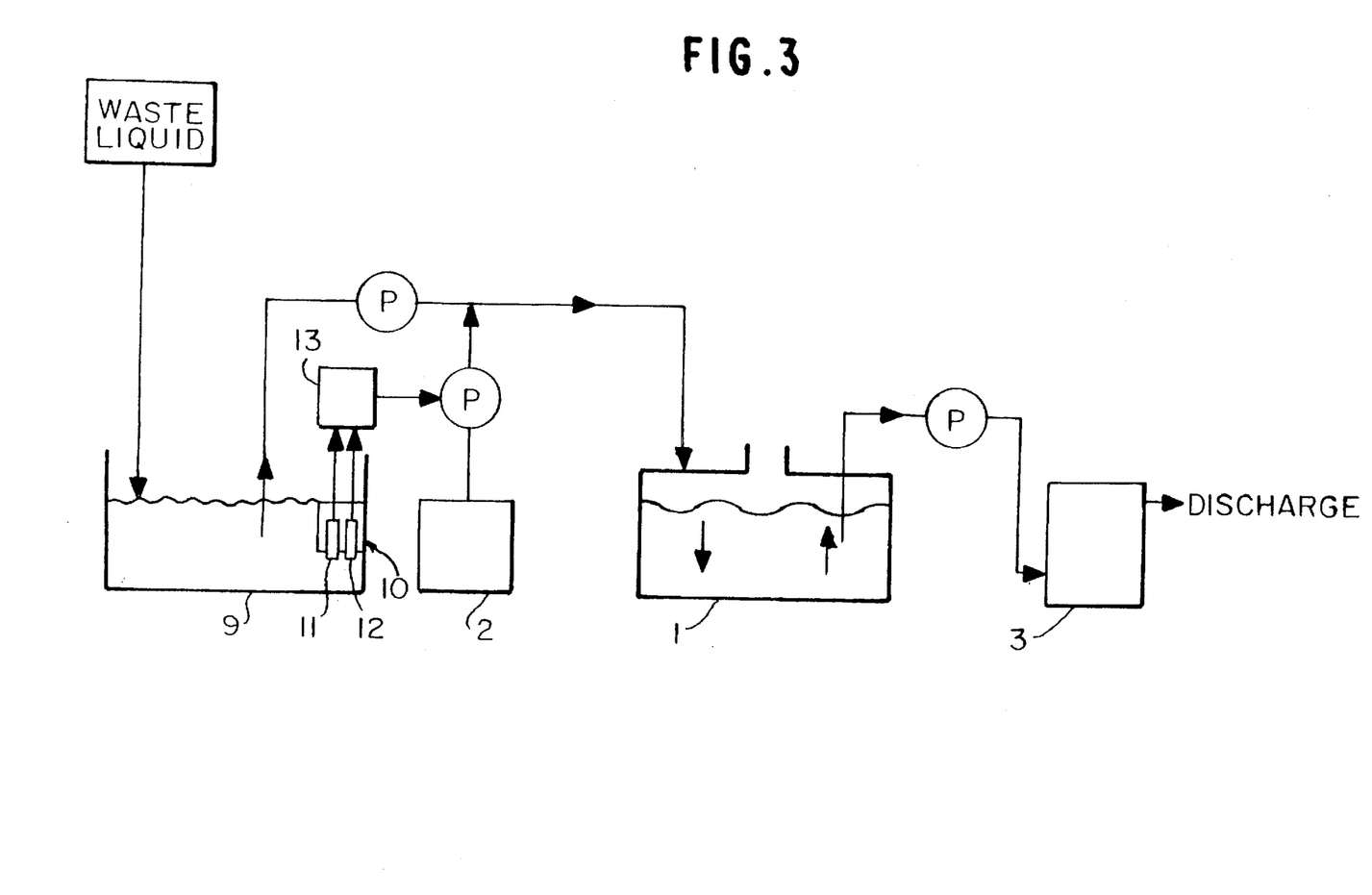
FIG. 3 is a schematic demonstration of the other embodiment of the device for use in the process of the present invention.

A silver-ion sensor is then disposed in a waste-water tank 9 as shown in FIG. 3. The silver-ion sensor 10 functions to measure the potential attributable to the silver thiosulfate ions present in the waste water, and has at its tip a silver sulfide electrode 11 and a silver chloride standard electrode 12. When the two electrodes 11 and 12 come into contact with the waste water, the potential attributable to the silver thiosulfate ions is measured to determine the silver-ion concentration. A controller 13 has a built-in LUT (look up table) in which silver concentrations and the corresponding amounts of a complex-forming agent to be added are stored. The controller 13 refers to the LUT to determine the amount of the complex-forming polymer to be added which amount corresponds to the determined silver concentration (potential signal). In place of the LUT, an arithmetic means may be added which, from the determined silver concentration, calculates the corresponding amount of a complex-forming agent to be added. The controller 13 can control the rate of the flow of the solution of the complex-forming polymer from the tank 2 with the pump P based on the potential signal. By varying the amount of the solution of the complex-forming polymer to be injected into the stock tank 1 according to fluctuations in the silver-ion concentration determined by the silver-ion sensor, the equivalent ratio of the complex-forming polymer to the silver ions present in the waste water is kept always constant.

The over-flow waste water may be stored in a storage tank before being sent to the stock tank 1.

The over-flow waste water may be mixed with an over-flow waste water which has overflown the washing tank disposed immediately after the bleaching tank N2, before being treated by the present invention. By using this method, not only the iron ions contained in the washing tank immediately after the bleaching tank N2 can also be removed by the process of the present invention, but also the odor of the complex-forming polymer can be eliminated.

The present invention will be explained below by reference to Examples, but the invention should not be construed as being limited thereto.

EXAMPLE 1

As a silver halide photographic material (hereinafter also referred to as "photographic material"), one consisting of 40% Fuji Color Super G-100 and 60% Fuji Color Super G-400 was used. In this Example, color-negative-processing kit CN16X, manufactured by Fuji Photo Film Co., Ltd., was used as processing agents, and the processing steps for the kit were used. As an automatic processor, color-negative automatic processor FNCP-600II, manufactured by Fuji Photo Film Co., Ltd., was used.

Figure 1:
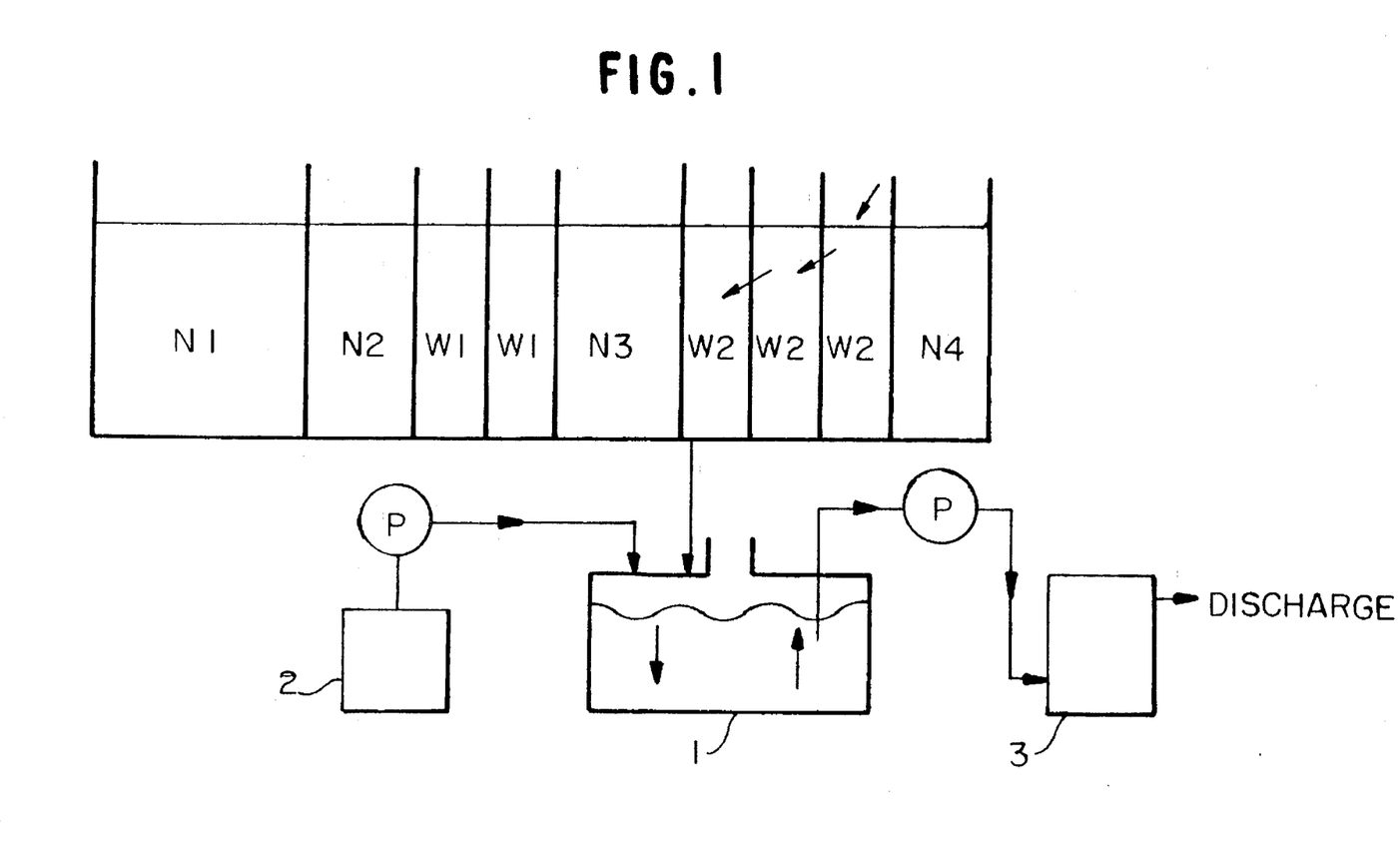
FIG. 1 is a schematic demonstration of one embodiment of a device for use in the process of the present invention.

As a treating device according to the present invention, the device shown in FIG. 1 was used. The washing after N3 processing step was conducted by the super rinsing method in which water was replenished at a rate of 2.5 liters per $m^2$ of the photographic material to perform 3-tank cascade washing. As the washing water, tap water was used.

As shown in FIG. 1, the water which had overflown the first of the washing tanks W2 was used as a waste water. A 0.35 wt % aqueous solution of Exemplified Compound (10) specified hereinabove (number average molecular weight, 100,000) was added in an amount of 26 ml to 100 liters of the waste washing water (the molar ratio of the silver-adsorbing functional groups of Compound (10) to silver was regulated to 1.4/1). This mixture was stirred at room temperature for 20 seconds with a Satake-type agitating blade, allowed to stand for 10 minutes, and then filtered with a single layer membrane microfilter having a pore size of 0.45 µm (YC-25, manufactured by Yuasa K.K.; effective membrane area, 25 $m^2$) at a pressure of 0.1 to 0.2 $kg/cm^2$ and a filtration rate of 6 l/min. Using the same filter, this filtration operation was batch-wise performed 6 times, in which 100 liters of the waste water was treated in each operation. The resulting filtrates were analyzed by atomic absorption spectrometry to determine the silver concentrations thereof. The results obtained are given in Table 1. The silver concentration in the waste washing water before the treatment was 120 ppm.

TABLE 1

| | Measurement Time | | Ag Concentration in Filtrate |
|---|---|---|---|
| 1st | after | 30 l treatment | 33.41ppm |
| | after | 100 l treatment | 2.40ppm |
| 2nd | after | 30 l treatment | 0.64ppm |
| | after | 100 l treatment | 0.58ppm |
| 3rd | after | 30 l treatment | 1.51ppm |
| | after | 100 l treatment | 0.39ppm |
| 4th | after | 30 l treatment | 0.40ppm |
| | after | 100 l treatment | 0.51ppm |
| 5th | after | 30 l treatment | 0.38ppm |
| | after | 100 l treatment | 0.01ppm |
| 6th | after | 30 l treatment | 0.01ppm |
| | after | 100 l treatment | 0.02ppm |

As Table 1 shows, the filtrate obtained in the beginning of the filtration contained a considerably large amount of silver, but the silver concentrations in filtrates decreased gradually with the progress of the treatment. The fifth operation (in which the treated waste water amounted to 500 liters) and the subsequent operation succeeded in desilvering to 0.02 ppm or lower. In filtration with the microfilter used in this Example (single layer membrane filter having a pore size of 0.45 µm), a polymer having a molecular weight on the order of 100,000 should easily pass through the pores to come into the filtrate. Despite this, the silver concentration of 120 ppm in the waste washing water was reduced to the order of $10^{-4}$ by filtering the waste water.

It is therefore presumed that part of the polymer-silver complex adheres to the surface of the microfilter to impart a performance similar to an ultrafiltration membrane capable of molecular fractionation and, as a result, the polymer-silver complex having a small size is inhibited from passing through the membrane to attain such high-performance filtration.

EXAMPLE 2

Processing was conducted on an automatic processor using as photographic materials (i) a color negative film, (ii) a color paper, (iii) a color reversal film, and (iv) a color reversal paper and using as processing kits (i) CN-16X manufactured by Fuji Photo Film Co., Ltd., (ii) CP-45X manufactured by Fuji Photo Film Co., Ltd., (iii) CR-56P manufactured by Fuji Photo Film Co., Ltd., and (iv) RP-303 manufactured by Fuji Photo Film Co., Ltd. The over-flow liquids resulting from the respective processings which liquids each had overflown the washing tank disposed after a tank for a processing step having a fixing ability were mixed together, and the silver concentration of the mixed waste washing water was measured. As a result, the silver concentration fluctuated from 12 to 60 ppm in a month and from 15 to 30 ppm in each day.

As a device for desilvering the mixed waste washing water, the device shown in FIG. 3 was used. The waste washing water was first stored in a waste-water stock tank 9. This waste water was introduced into a 500-liter stock tank 1 at a flow rate of 100 l/hr, during which introduction a 1 wt % aqueous solution of Epofloc L-1 (manufactured by Miyoshi Oil & Fat Co., Ltd.) as a complex-forming polymer of the present invention was mixed at a rate of 370 ml/hr with the waste water in the piping (the molar ratio of the silver-adsorbing functional groups of Epofloc L-1 to silver was regulated to 2.0). The mixture in the stock tank was stirred at 25° C. for 20 seconds with a Satake-type agitating blade, allowed to stand for 30 minutes, and then filtered with the microfilter YC-25 specified above at a pressure of 0.1 to 0.2 $kg/cm^2$ and a filtration rate of 5 l/min. Thus, batch-wise filtration was conducted in the same manner as in Example 1.

The silver concentration in the filtrate decreased to 0.01 ppm at the time when the treated waste water had amounted to 600 liters (6 hours after the initiation of the treatment), and this concentration level was thereafter maintained throughout the first day of the treatment. That is, desilvering was sufficient in the first day. However, when the treatment was continued for one month, the silver concentration in the filtrate was 0.76 ppm, 3.28 ppm, and 1.70 ppm on three alternate days, respectively. The filtrate having such a high concentration cannot be discharged into a sewer system in the regions where silver concentration is regulated by discharge regulations (Ag<0.1 ppm).

A silver-ion sensor 10 is then disposed in a waste-water stock tank 9 as shown in FIG. 3. The silver-ion sensor 10 functions to measure the potential attributable to the silver thiosulfate ions present in the waste water, and has at its tip a silver sulfide electrode 11 and a silver chloride standard electrode 12. When the two electrodes 11 and 12 come into contact with the waste water, the potential attributable to the silver thiosulfate ions is measured to determine the silver-ion concentration. The controller 13 can control the rate of the flow of the solution of Epofloc L-1 from the tank 2 based on a signal for the potential by means of a pump P. The amount of the Epofloc L-1 was thus varied according to fluctuations in the measured silver concentration in the waste water. The treatment was performed in this manner for one month. As a result, the silver concentration in the filtrate was always 0.03 ppm or lower throughout the 1-month period, and never exceeded the upper limit prescribed in the regulations.

Therefore, by disposing a silver sensor and conducting the treatment while varying the amount of the complex-forming polymer according to fluctuations in the measured silver concentration, long-term stable desilvering is possible even when the silver concentration in the waste water fluctuates.

On the other hand, during the one-month operation, the filter clogged and the filtration pressure exceeded 0.8 kg/cm². Hence, the operation was stopped, and air was injected into the housing with a compressor through an air inlet 14 shown in FIG. 2 at a pressure of 0.3 to 0.5 kg/cm² to conduct bubbling cleaning for 10 to 20 minutes. The resulting drain containing a polymer-silver complex was taken out from a sludge outlet 8. The operation was then restarted. As a result, the filtrate obtained immediately thereafter already had a silver concentration of 0.03 ppm or lower. It was thus ascertained that even when the filtrate used in the present invention clogs during operation, the unnecessary precipitate only can be removed by simple cleaning and the high filtration performance can be maintained continuously.

EXAMPLE 3

The same filtration treatment as in Example 1, in which 100-liter filtration was conducted 6 times, was carried out except that the filtration pressure applied to the microfilter, YC-25, was varied as shown in Table 2 given below. The silver concentration in the filtrate obtained after the 6th filtration is shown in Table 2 below.

TABLE 2

| Applied Pressure | Ag Concentration in Filtrate | Treating Ability |
| --- | --- | --- |
| 0.1 kg/cm² | 0.27 ppm | 1 l/min |
| 0.03 kg/cm² | 0.21 ppm | 2 l/min |
| 0.1 kg/cm² | 0.02 ppm | 6 l/min |
| 0.3 kg/cm² | 0.01 ppm | 6–10 l/min |
| 0.8 kg/cm² | 0.01 ppm | 6–10 l/min |
| 1.0 kg/cm² | 0.63 ppm | 6–10 l/min |
| 1.5 kg/cm² | 4.76 ppm | 6–10 l/min |
| 3.0 kg/cm² | 30.32 ppm | 6–10 l/min |
| 10 kg/cm² | 47.73 ppm | 6–10 l/min |

It was ascertained that, as Tables 2 shows, the silver concentration in the filtrate becomes minimum when the pressure is in the range of from 0.1 to 0.8 kg/cm². Pressures lower than the above range result in a reduction in the efficiency of waste-liquid treatment, while pressures higher than that range result in an increase in the amount of the polymeric silver complex which passes through the microfilter.

EXAMPLE 4

The same filtration treatment as in Example 1 was carried out except that the temperature for the desilvering operation beginning with the addition of Exemplified Compound (10) to the waste water and ending with the initiation of filtration with the microfilter was varied from room temperature to 50° C. to examine the time from the addition of Compound (10) to the initiation of the filtration which time was required for the filtrate obtained after the 6th filtration to have a reduced silver concentration almost the same as in Example 1. The results obtained are shown in FIG. 4.

As shown in the graph in FIG. 4, the treating time necessary for completing the desilvering was about 20 seconds or shorter at temperatures of 30° C. and higher, whereas a treating time of 1 minute or more are needed at 20° C. or lower. As the temperature decreased below 20° C., the necessary treating time increased at an increasing rate. Therefore, by conducting the treatment at a temperature of about 30° to 60° C., a precipitate of the polymer-silver complex can be formed in a shorter time, i.e., the time for contacting and stirring can be reduced.

EXAMPLE 5

Figure 6:
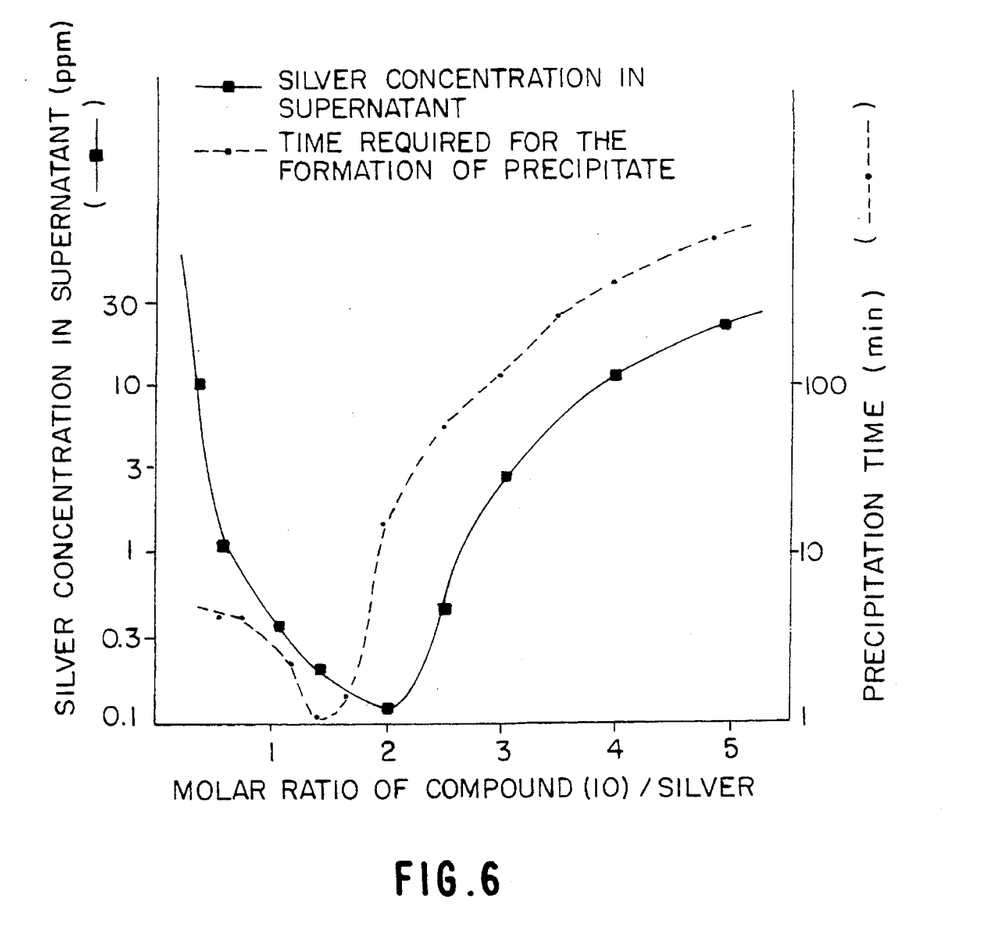
FIG. 6 is a graph showing the relationship between the molar ratio of Compound (10)/silver and silver content in supernatant (real line) and precipitation time (dotted line).

The same filtration treatment as the first 100-liter batch treatment in Example 1 was carried out at room temperature except that the molar ratio of the complex-forming polymer to silver (i.e., the equivalent ratio of the complex-forming polymer to silver) was varied to examine the time from the addition of the complex-forming polymer to the formation of a precipitate and to determine the concentration of free silver in the supernatant in the stock tank 1. The results obtained are shown in FIG. 6.

When the molar ratio of Compound (10) to silver was in the range of from 0.5 to 2, the time required for the formation of a precipitate of the polymer-silver complex was 10 minutes or shorter. When that molar ratio was in the range of from 0.5 to 2.7, the silver concentration in the supernatant was lower than about 1 ppm. Further, when that molar ratio was in the range of from 1.5 to 2.5, the silver concentration in the supernatant was about 0.3 ppm or lower.

Therefore, for attaining both a permissible precipitation time and a permissible silver concentration, that molar ratio should be from 0.5 to 4. For attaining a silver concentration below 1 ppm and a precipitation time below 100 minutes, that ratio should be from 0.5 to 2.7. The optimum range of the equivalent ratio of the complex-forming polymer to silver in which range the precipitate formation time was relatively short and the silver concentration in the supernatant was low was from 1.5 to 2 in the case of Exemplified Compound (10). From the standpoint of giving priority to desilvering, that ratio was from 0.8 to 3, preferably from 0.5 to 2.7, more preferably from 1 to 2.3.

With respect to Examplified Compound (9), the equivalent ratio of the complex-forming polymer to silver was examined likewise. As a result, the optimum range of that ratio was from 2 to 3.5. From the standpoint of giving priority to desilvering, that ratio was from 2 to 4. For attaining both a high degree of desilvering and a short precipitate formation time, that ratio was from 1 to 4. These results indicate that that ratio should be in the range of from 0.5 to 4.

EXAMPLE 6

The same filtration treatment as in Example 1 was carried out using the same device as that shown in FIG. 1 except the following. The waste washing water from the tank disposed immediately after the fixing bath tank N3 was mixed in the piping with an over-flow waste water from the tank W1 disposed immediately after the bleaching bath tank N2 to give a mixed waste water (silver concentration, 15 ppm), and 49 ml of the same 0.35 wt % aqueous solution of Exemplified Compound (10) as that used in Example 1 was introduced into the 100-liter stock tank and mixed with the mixed waste water. The equivalent ratio of the Exemplified Compound (10) to silver and iron was 1.3. Further, water was replenished in the washing tanks W1 at a rate of 2 liters per m² of the photographic material.

Besides the silver concentration in the filtrate which had passed through the microfilter (YC-25), the iron concentration therein was measured by atomic absorption spectrometry. The iron concentration in the mixed waste water was 2.32 ppm, but it decreased to 0.21 ppm through the treatment of the present invention. The silver concentration in the filtrate was 0.03 ppm, showing that desilvering had been satisfactory. It was thus found that the iron contained in the over-flow waste water from the tank W1 disposed immediately after the bleaching bath tank N2 had been removed by the treatment.

EXAMPLE 7

The waste water treatment of the present invention was performed using a waste water from a washing tank disposed immediately after a fixing bath in black-and-white processing in place of the waste washing water resulting from the color-negative processing in Example 1.

The fixing bath used here was the same as that used in the Example 1 given in JP-A-4-293045 (which bath contained aluminum sulfate). To the over-flow waste water (silver concentration, 13 ppm) which had overflown the washing tank disposed after the fixing bath was added 73 ml of the same 0.35 wt % aqueous solution of Exemplified Compound (10) as that in Example 1 to perform desilvering. The equivalent ratio of Exemplified Compound (10) to silver and aluminum was 2.8. The other conditions were the same as in Example 1.

The aluminum concentration in the waste water was 311 ppm, but it decreased to 0.78 ppm through the treatment of the present invention. The silver concentration in the filtrate was 0.06 ppm, which was satisfactorily low. It was thus found that the process of the present invention for waste-liquid treatment is effective in removing aluminum as well as silver.

EXAMPLE 8

The same device as that shown in FIG. 1 was used except that the washing tanks W2 disposed after the fixing tank N3 were changed to four cascade-type tanks, that the stabilizing bath N4 was modified so as to overflow into the 4th tank of the washing tanks W2, that the desilvering device of the present invention had been united into an automatic photographic-material processor, and that the mixing of a waste water with a complex-forming polymer was conducted in the piping.

The waste water from the washing tank W2 disposed immediately after the fixing bath N3 was treated by the present invention. The silver concentration in the waste water was 132 ppm. The other conditions were the same as in Example 1.

The filtrate which had undergone the desilvering treatment had a silver concentration of 0.13 ppm, showing that the desilvering had been sufficient. Therefore, even when the desilvering device of the present invention is united into an automatic processor, silver is satisfactorily removed. Thus, even in general photofinishing laboratories, waste waters can be easily desilvered.

EXAMPLE 9

As in Example 6, the washing water which had overflown the washing tanks W1 disposed after the bleaching tank was mixed with the washing water which had overflown the washing tanks W2 disposed after the fixing tank, and this mixed waste water (silver; about 15 ppm) was used. The device used here was the same as in Example 6 except that it was provided with a mixing tank so that the mixed waste water was batch-wise mixed with a complex-forming polymer before being introduced into the stock tank 1.

The waste water in an amount of 100 liters was sent to the mixing tank, and 0.5 to 1 liter of a 36 wt % aqueous solution of Examplified Compound (9) (number-average molecular weight, 180,000) as a complex-forming polymer was added thereto (the equivalent ratio of Compound (9) to silver, 1.4 to 2.8). The resulting mixture was stirred for 10 to 20 seconds, allowed to stand for 20 to 40 minutes, and then transferred to the stock tank 1. The liquid in the stock tank 1 was sent to the aforementioned microfilter YC-25 at a constant rate of 5 l/min. At the time when the waste water thus treated had amounted to 300 liters, the silver concentration in the filtrate was 0.1 ppm or lower.

By employing the above constitution, the treatment in the mixing tank only can be performed batch-wise, with the subsequent filtration treatment being performed continuously.

EXAMPLE 10

Desilvering treatment was performed in the same manner as in Example 6 except the following. The aforementioned Examplified Compound (9) was added in place of Exemplified Compound (10) with a flow control pump, while the over-flow waste water from the washing tank was introduced into the stock tank with a flow control pump, so that the proportion of the two liquids was suitably regulated. Further, the stock tank 1 was provided with a liquid-level sensor around the liquid level so as to regulate the operation of the pump for waste water according to fluctuations in the liquid level. As a result, long-term continuous desilvering could be performed without any problem.

Due to the above-described constitution, the equivalent ratio of the complex-forming polymer to the silver present in the waste water can be kept always constant, and the treating system can be stably and continuously operated without liquid leakage from the stock tank.

EXAMPLE 11

Desilvering treatment was performed in the same manner as in Example 9 except the following. The mixing tank disposed before the stock tank was provided with a densitometer for soybean milk (SM-20 manufactured by Amago K.K.). At the time when the waste water to which Examplified Compound (9) had been added had come to have a density as measured by the SM-20 of 10%, the waste water was sent to the stock tank and filtered with YC-25.

After the above treatment was batch-wise performed 6 times, the silver concentration of the filtrate which had passed through the YC-25 was measured and found to be 0.02 ppm.

The above results show that by ascertaining the sufficient formation of a precipitate before conducting filtration, the degree of desilvering is improved further.

Moreover, the same treatment was conducted except that the formation of a precipitate was detected with a commercially available densitometer in place of the SM-20. As a result, the same effect was obtained.

The present invention has the effects of providing a process for treating a photographic waste water containing a processing liquid resulting from a processing step having a bleaching ability or a fixing ability in the processing of a silver halide photographic material, by which process a metal contained in the waste water can be easily removed therefrom at low cost with high accuracy, and of providing a device for use in practicing the process and an automatic processor for a silver halide photographic material which processor has the device united thereinto.

While the invention has been described in detail and with reference to specific embodiments thereof, it will be apparent to one skilled in the art that various changes and modifications can be made therein without departing from the spirit and scope thereof.

What is claimed is:

1. A process for treating a photographic waste water containing a used processing liquid resulting from a processing step having a bleaching ability or a fixing ability in the processing of a silver halide photographic material, which process comprises adding a polymer capable of forming a complex with at least one metal in the waste water to the waste water in an amount in the range of from 0.5 to 4 equivalents to a metal contained in the waste water to thereby form a polymer-metal complex and then separating the polymer-metal complex with a single layer membrane filter having a pore size of 0.05 to 10 μm to remove the metal, wherein one metal of the at least one metal is silver, and wherein the polymer-metal complex has a size which is smaller than the pore size.

2. The process for treating a photographic waste water as claimed in claim 1, wherein the complex-forming polymer comprises a water-soluble polymer ligand having a number-average molecular weight of from 50,000 to 500,000.

3. The process for treating a photographic waste water as claimed in claim 1, wherein the complex-forming polymer comprises a hydrophilic linear polymer having a recurring unit containing one sulfur atom.

4. The process for treating a photographic waste water as claimed 3, wherein the hydrophilic linear polymer is a water-soluble linear polymer having a dominant water-solubilizing group, wherein a dithiocarbamate functional group is the dominant water-solubilizing group.

5. The process for treating a photographic waste water as claimed in claim 1, wherein the addition of the complex-forming polymer to the waste water is conducted at a temperature between 30° C. and 60° C.

6. The process for treating a photographic waste water as claimed in claim wherein the complex-forming polymer is added to the waste water in an amount in the range of from 0.8 to 3 equivalents to a metal contained in the waste water.

7. The process for treating a photographic waste water as claimed in claim 1, wherein the complex-forming polymer is added to the waste water in an amount in the range of from 1 to 2.3 equivalent to a metal contained in the waste water.

8. The process for treating a photographic waste water as claimed in claim 1, wherein the filtration with the single layer membrane filter is conducted while a pressure of 0.1 to 0.8 kg/cm$^2$ is uniformly applied throughout whole membrane surface of the filter.

9. The process for treating a photographic waste water as claimed in claim 8, wherein the filtration with the single layer membrane filter is conducted with the flow rate of the waste water of from 30 to 1,000 ml/m$^2$·min.

10. The process for treating a photographic waste water as claimed in claim 1, wherein the waste water is filtered through a precipitated layer 8 polymer-metal complex formed on the single layer membrane filter and the amount of the precipitated layer is in the range of from 5 to 40 ml/m$^2$.

11. The process for treating a photographic waste water as claimed in claim 1, wherein the concentration of the polymer-metal complex in the photographic waste water to which a complex-forming polymer has been added is determined by a device which analyzes concentrations optically using a densitometer, turbidimeter, or spectrometer, and then polymer-metal complex is separated with a single layer membrane filter having a pore size of 0.05 to 10 μm to remove the metal.

12. The process for treating a photographic waste water as claimed in claim 11, wherein the photographic waste water contains at least one compound selected from a silver compound, an iron compound, an aluminum compound, and a cerium compound.

13. The process for treating a photographic waste water as claimed in claim 12, wherein the silver concentration in the waste water is from 0.5 to 200 ppm.

14. The process for treating a photographic waste water as claimed in claim 12, wherein the silver concentration in the waste water is measured in advance and the amount of the complex-forming polymer to be added is determined based on the measured concentration.

* * * * *